INFORMATION STORAGE CHECKING MEANS

Filed April 5, 1963 2 Sheets-Sheet 1

FIG. I

INVENTOR
ALFRED G. EDDE
BY Louis A. Kline
Albert L. Sessler, Jr.
HIS ATTORNEYS

INVENTOR
ALFRED G. EDDE
BY Louis A Kline
Albert L. Sessler, Jr.
HIS ATTORNEYS

United States Patent Office 3,315,268

Patented Apr. 18, 1967

3,315,268

INFORMATION STORAGE CHECKING MEANS

Alfred G. Eddé, Dayton, Ohio, assignor to The National Cash Register Company, Dayton, Ohio, a corporation of Maryland Filed Apr. 5, 1963, Ser. No. 270,846

10 Claims. (Cl. 346—74)

This invention relates generally to accounting machines which can automatically pick up an old balance and related data from a record or ledger card, can be operated further to add or subtract amounts to or from the old balance to form a new balance, and can erase the old balance and its related data from the card, and record or store thereon in place thereof the new balance and its related data. In particular, the present invention relates to means for preventing further operation of such a machine, and for providing an indication to the operator, in the event of improper functioning of the machine during the automatic storage of information on the ledger card.

The present invention is adapted for use with an accounting machine of the type disclosed in United States Patent No. 2,947,475, issued Aug. 2, 1960, to Konrad Rauch et al., but is not intended to be limited to use with such a machine.

It is particularly important, in an accounting machine in which sensing and storage of information from and on ledger cards is accomplished automatically, that an effective checking means be provided to insure against improper storage of information, since such storage is accomplished in an automatic operation without any direct operator supervision. Therefore, in the absence of adequate checking means, an error in storage of information would not be detected and would remain on the ledger card, to be reflected in all subsequent operations involving the ledger card until detected.

One of the most common sources of error in information storage is the failure of recording current to flow through the recording circuits for one or more recording heads, due to the failure of one or more components in said circuits, where a plurality of storage heads are provided for parallel storage of information in a plurality of magnetic areas of a ledger card. In the improved storage checking means of the present invention, a signal-translating device, such as a transistor, is associated with the recording circuit for each channel or track in which information is to be stored, so as to be rendered conducting when a recording current of the proper magnitude passes through its associated recording circuit. All of these signal-translating devices are connected in parallel in an operating circuit for a control device, such as an electromagnetic relay, in such a manner that if all of the signal-translating devices are rendered conducting during a recording operation, the control device is not energized; but if any one or more of the signal-translating devices are not rendered conducting, then the control device is energized. Energization of the control device is effective to lock the accounting machine against further operation and to provide an indication of the recording failure to a machine operator, so that the error can be noted and corrected.

It is accordingly an object of the present invention to provide improved information storage checking means in a device capable of automatic storage of information.

A further object of the present invention is to provide, in a device capable of automatic storage of information, means for detecting improper operation in any one or more of a plurality of erasing and recording channels, for preventing further operation of said device, and for providing an indication to an operator, in the event of such failure.

An additional object of the present invention is to provide, in a device capable of automatic storage of information, storage checking means including a storage checking element for each one of a plurality of erasing and recording channels, said checking elements being connected in parallel to control an operating means which, in turn, can cause halting of operation of the device and initiation of an error signal indication to an operator.

With these and other objects, which will become apparent from the following description, in view, the invention includes certain novel features of construction and combinations of parts, a preferred form or embodiment of which is hereinafter described with reference to the drawings which accompany and form a part of this specification.

As is more fully described in the previously-mentioned United States Patent No. 2,947,475, magnetic storage of information in the various magnetic strips on the rear of a ledger card is accomplished during a new balance operation by first erasing the information previously stored on the strips by applying a potential of one polarity to the erasing and recording heads of the accounting machine as the ledger card is moved in one direction in an in-sweep past the heads, then applying potential of an opposite polarity to all heads and selectively removing said potential of an opposite polarity from the heads at various times according to the value of the information to be stored, as the ledger card is moved in the opposite direction in an out-sweep past the heads.

Figure 1:
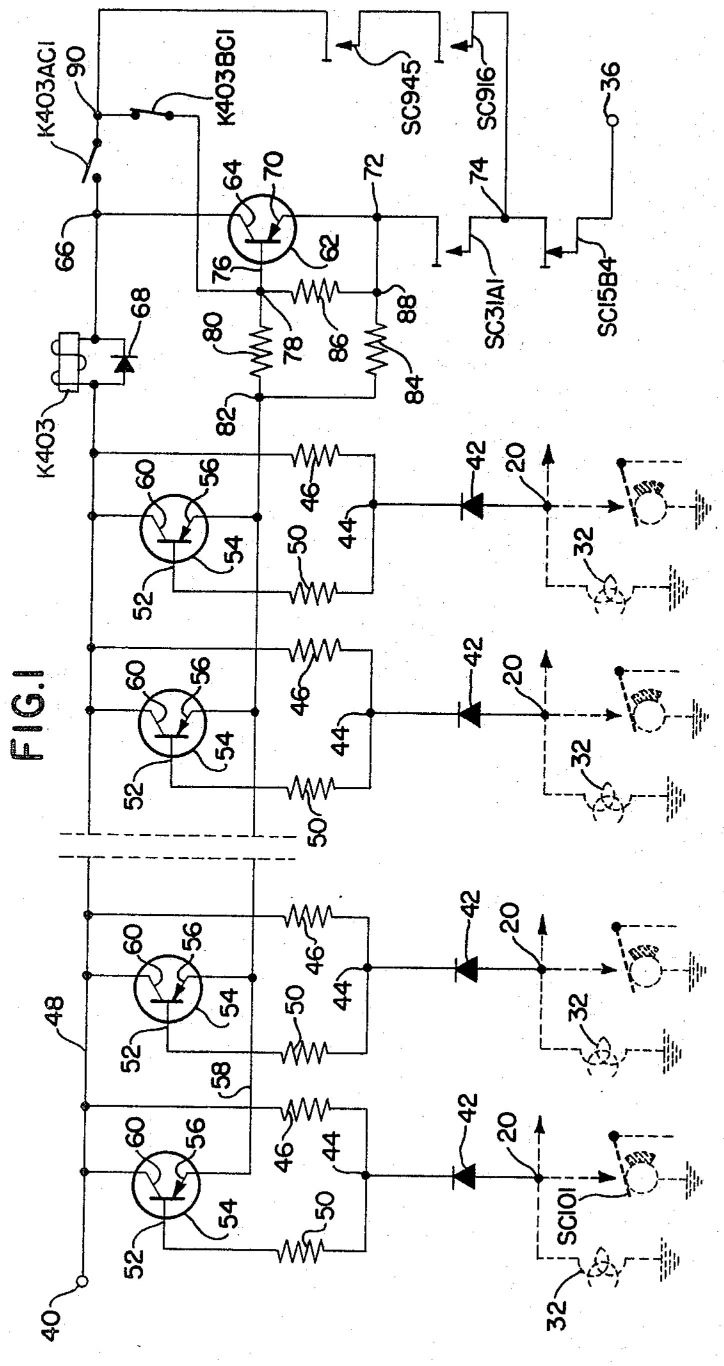
FIG. 1 is a circuit diagram showing a checking circuit for detecting a failure in any one or more of the erasing and recording circuits associated with the various information channels utilized by an accounting machine of the type described.
Figure 2:
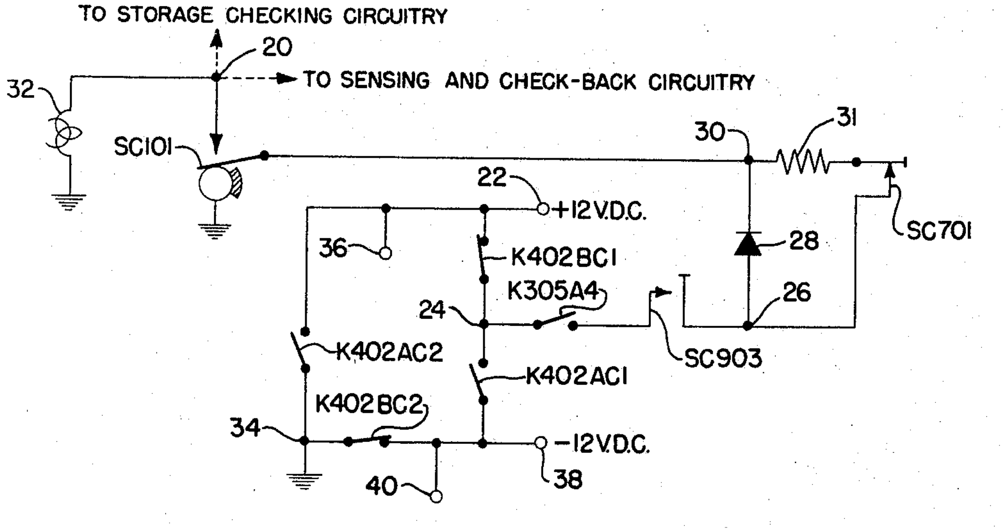
FIG. 2 is a circuit diagram showing a typical erasing and recording circuit for one information channel, associated with an accounting machine capable of automatic erasing and recording on a record member.

Shown in FIG. 2 is a diagram of the erasing and storage portion of the sensing, check-back, erasing, and storage circuitry for a single information channel, which circuitry may be used in an accounting machine of the type shown in the previously-mentioned United States Patent No. 2,947,475. The sensing and check-back portions of such circuitry have not been shown in FIG. 2, since they are not pertinent to the present invention, but are connected to the illustrated circuit at a point 20, as indicated by an arrow-headed line extending to the right, as viewed in FIG. 2. Similarly, the checking circuit of FIG. 1 is connected to the circuit of FIG. 2 at the point 20, as indicated by a line extending vertically upward, as viewed in FIG. 2, from said point.

In the circuit of FIG. 2, the erasing circuit extends from a terminal 22, to which is applied a plus 12-volt D.C. potential, over the contacts K402BC1, controlled by the relay K402 (not shown), which is deenergized at this time; over a point 24; over the contacts K305A4, which are controlled by the storage relay K305 (not shown), energized at this time; over the contacts SC903, which are controlled by a cam on the auxiliary cam line of the accounting machine, to close at 18 degrees of rotation of said cam line, and to open at 342 degrees; over a point 26; over a diode 28, which may be of type SD92 manufactured by the International Rectifier Corporation, and which is oriented so that when the plus 12-volt potential is applied thereto, it has a low impedance; over a point 30; over the contacts SC101, which are controlled by the auxiliary cam line of the accounting machine and which are closed during erasing and recording operations; over the point 20; and over an erasing and recording head 32, to a base reference potential, shown here as ground. The diode 28 allows an erasing current to flow through the head 32 during the entire in-sweep of the ledger card, regardless of the condition of the recording contacts SC701. Therefore, during the in-sweep of the ledger card, the magnetic strip associated with the head 32 is erased by being magnetized in the same polarity throughout its entire length.

When the accounting machine ledger card carriage has finished its in-sweep, the relay K402 is energized to open the contacts K402BC1 and K402BC2, and to close the contacts K402AC1 and K402AC2, so that the circuit path to the head 32 from the terminal 22 is interrupted. The terminal 22 is now connected over the closed contacts K402AC2 to a base reference potential, shown in FIG. 2 as ground, at point 34. It will be noted that a terminal 36 is connected between the contacts K402AC2 and the terminal 22. The checking circuit of FIG. 1 is connected to the terminal 36, as will subsequently appear.

A new circuit path is completed, which extends from a terminal 38, to which is applied a minus 12-volt D.C. potential, over the contacts K402AC1; the point 24; the contacts K305A4; and the contacts SC903, to the point 26. Opening of the contacts K402BC2 interrupts a previous connection of the terminal 38 to ground at the point 34. It will be noted that a terminal 40 is connected between the contacts K402BC2 and the terminal 38. The checking circuit of FIG. 1 is connected to the terminal 40, as will subsequently appear.

With minus 12 volts applied to the circuit of FIG. 2, the diode 28 has a high impedance, and the head 32 is, therefore, energized over the recording control contacts SC701, in series with a 150-ohm resistor 31, according to the information to be stored. During the storage cycle, as the ledger card is swept outwardly on the accounting machine carriage, the recording control contacts SC701 are opened, by a storage cam in the accounting machine, which has been set according to the information which it is desired to store in the channel being described. Opening of the contacts SC701 interrupts the recording circuit to the head 32 and produces a magnetic discontinuity, or "spot," in the channel, which "spot" can be magnetically sensed in a subsequent sensing operation on the card, to cause entry into the machine of information corresponding to the location of the "spot" on the magnetic strip of the card.

For a more detailed description of the erasing and recording circuitry, and for a complete description of the sensing and check-back circuitry, reference may be had to the previously-mentioned United States Patent No. 2,947,475.

Shown in FIG. 1 is a circuit diagram of the storage checking means of the present invention. Four heads 32, associated with four different erasing and recording circuits, are shown in phantom lines, connected to the checking means, but it will be understood that the checking means can be utilized with whatever number of erasing and recording heads may be present in a given accounting machine or other device. In each erasing and recording channel, at the point 20 between the head 32 and the contacts, such as contacts SC101, a path is provided over a unidirectional conducting device or diode 42, which may be a semiconductor diode of type 1N2070 manufactured by International Rectifier Corporation, said path extending to a point 44. The diodes 42 are necessary in order to isolate the various sensing, check-back, erasing, and recording circuits from each other. From each point 44, a first branch extends over a 22,000-ohm resistor 46 to a conductor 48, which is connected to the terminal 40, which, it will be recalled, is connected to the terminal 38 of FIG. 2. Also from each point 44, a second branch extends over a 10,000-ohm resistor 50 to a control element 52 of a signal-translating device, shown here as a p-n-p transistor 54, which may be of type NCR404, manufactured by Radio Corporation of America, and which serves a circuit-checking function in the present invention.

In FIG. 1, the control elements 52 are shown as the bases of the transistors 54. The emitters 56 of said transistors are directly connected to a conductor 58, and the collectors 60 of said transistors are directly connected to the conductor 48. It will, of course, be obvious to one skilled in the art that some other suitable type of signal-translating device, such as triode vacuum tubes, diodes, or relays, could be used in place of the transistors 54. All of the transistors 54 are connected in parallel, with their emitters 56 directly connected to the conductor 58 and their collectors 60 directly connected to the conductor 48.

An additional signal-translating device is employed for the purpose of current amplification in the checking circuit, and is shown in FIG. 1 as a p-n-p transistor 62, which may be of type NCR404, manufactured by Radio Corporation of America. If desired, some other type of signal-translating device, such as a triode vacuum tube, could be used in place of the transistor 62.

The collector 64 of the transistor 62 is connected over a point 66 to one side of a relay K403, the other side of which relay is connected to the conductor 48. A unidirectional conducting device or diode 68, which may be a semiconductor diode of type 1N2070 manufactured by International Rectifier Corporation, is connected in parallel with the relay K403, for the purpose of suppressing unwanted signals which are induced in the circuit when the relay is deenergized. The emitter 70 of the transistor 62 is connected over a point 72; the contacts SC31A1, which are controlled by accounting machine mechanism to close only during a new balance operation; and the contacts SC15B4, which are controlled to close when the line-finding solenoid L2 in the accounting machine is energized; to the terminal 36, which, it will be recalled, is connected to the terminal 22 of FIG. 2. The base 76 of the transistor 62 is connected over a point 78, a 10,000-ohm resistor 80, and a point 82 to the conductor 58. In parallel with the resistor 80, between the base 76 and the point 82, is a series combination of a 3,900-ohm resistor 84 and a 430-ohm resistor 86. A point 88 between the resistors 84 and 86 is connected to the point 72 in the circuit of the emitter 70.

From the point 78, another circuit path extends over contacts K403BC1, controlled by the relay K403 to open when said relay K403 is energized, to a point 90. Additional contacts K403AC1, controlled by the relay K403 to be closed when said relay is energized, connect the point 90 to point 66.

From the point 90, an additional circuit path extends over contacts SC945, which are controlled by the main cam line of the accounting machine to close at 250 degrees and to open at 200 degrees of rotation; and the contacts SC916, which are controlled by the auxiliary cam line of the accounting machine to close at 45 degrees and to open at 5 degrees of rotation; to the point 74.

Figure 3:
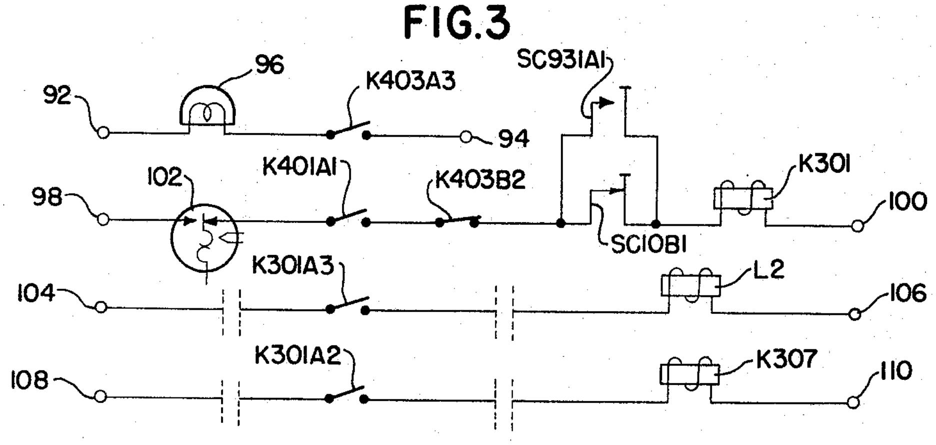
FIG. 3 shows a plurality of miscellaneous circuits associated with the checking circuit.

Additional contacts are controlled by the relay K403 to perform various functions in the accounting machine operating circuitry, and these contacts, together with the circuits in which they are included, and certain additional circuits, are shown in FIG. 3.

A first circuit in FIG. 3 extends between terminals 92 and 94, across which a 6.3-volt 60-cycle A.C. potential is applied, and includes an indicator light 96 and contacts K403A3, which are controlled by the relay K403. Energization of the relay K403 causes the contacts K403A3 to close, completing the circuit for illuminating the indicator light 96, which provides an indication to the machine operator that there has been a failure in the storage circuitry.

A second circuit in FIG. 3 extends between terminals 98 and 100, across which a 115-volt, 60-cycle A.C. potential is applied. This circuit includes a thermostatically-controlled delay element 102, which keeps the circuit from energizing for a given period of time after the power has been applied to the accounting machine; the contacts K401A1, which are controlled by the relay K401, which relay deenergizes to open said contacts in the event of a filament failure in certain vacuum tubes in the sensing, check-back, erasing, and recording circuits; the contacts K403B2, controlled by the relay K403 of FIG. 1 to open if said relay is energized; a parallel combination of contacts SC10B1 (which are normally closed, and open only in the event of an erroneous entry of information from a ledger card into the accounting machine) and contacts SC391A1 (which are controlled by the main cam line to close at 60 degrees of rotation and to open at 25 degrees of rotation); and the relay K301.

The relay K301 is normally energized after power is applied to the accounting machine, and normally remains energized during operation of the machine. Deenergization of the relay K301 is effective to lock the machine against further operation by means of contacts shown in two other circuits shown in FIG. 3.

One of these circuits is shown extending between terminals 104 and 106, to which is applied a 115-volt, 60-cycle A.C. potential. This is an energizing circuit for a solenoid L2 in the accounting machine and includes, in addition to a number of other contacts which are not pertinent to the present invention, the contacts K301A3, which are controlled by the previously-mentioned relay K301. It will be seen that deenergization of the relay K301 opens the contacts K301A3 and thus prevents energization of the solenoid L2. Since neither a balance pick-up operation nor a new balance operation of the accounting machine can be initiated without energization of the solenoid L2, it will be seen that energization of the relay K403, due to its effect in deenergizing the relay K301, acts to prevent initiation of a balance pick-up or new balance operation of the accounting machine.

The other of the circuits referred to above is shown extending between terminals 108 and 110, to which is applied a 115-volt 60-cycle A.C. potential. This is an energizing circuit for a relay K307 in the accounting machine and includes, in addition to a number of other contacts which are not shown, since they are not pertinent to the present invention, the contacts K301A2, which are controlled by the previously-mentioned relay K301. It will be seen that deenergization of the relay K301 opens the contacts K301A2 and thus prevents energization of the relay K307. Since no operation can be initiated from either control row of the accounting machine keyboard without energization of the relay K307, energization of the relay K403, due to its effect in deenergizing the relay K301, also acts to prevent initiation of any control row 1 or 2 operation of the accounting machine, as well as a new balance or balance pick-up operation. The machine therefore is completely locked against further operation, if the relay K403 is held in energized condition, and must be turned off in order to release the locked condition. The machine operator is thus prevented, by energization of the relay K403, and maintaining of said relay in energized condition, from making any further machine operations in the event of a failure of any one or more storage circuits. The manner in which the relay K403 is energized and maintained in energized condition will be described subsequently.

The mode of operation of the checking circuit of FIG. 1 will now be described. As explained in the previously mentioned United States Patent No. 2,947,475, after all of the entries of a transaction being processed by an accounting machine of the type described therein have been made on a ledger card, the machine is operated in plural-cycle operation of the main cam line in which the new balance and related data are printed on the ledger card. Thereafter, during an operation of the auxiliary cam line, data previously magnetically recorded on the card is erased, and data pertaining to the new balance is stored magnetically on the card in its stead. It is during this erasing and storage portion of the new balance operation that the checking circuit of FIG. 1 functions.

It will accordingly be assumed for the purpose of explaining the operation of the circuit of FIG. 1 that a new balance operation of the machine in which the circuit is incorporated has been initiated. At the time of commencement of the new balance operation, a plus 12-volt D.C. potential is applied to the terminal 36 of FIG. 1, while the terminal 40 is grounded. Soon after the beginning of the new balance operation, the contacts SC31A1 close. Since the contacts SC15B4 are also closed at this time, a plus 12-volt D.C. potential is applied from the terminal 36 to the emitter 70 of the transistor 62. A potential is also applied from the point 72 in the emitter circuit of the transistor 62, over the resistor 84, to the emitters 56 of the transistors 54. Since the bases of the transistors 54 are connected over resistors 46 and 50 to the grounded terminal 40, the bases of these transistors are negative with respect to the emitters, and the transistors 54 will therefore conduct.

This establishes a current path which extends from the plus 12-volt terminal 36 over the contacts SC15B4, the point 74, the contacts SC31A1, the point 72, the point 88, the resistor 84, the point 82, the conductor 58, the parallel transistors 54, and the conductor 48, to the grounded terminal 40. However, since the contacts SC916, SC945, and K403BC1 are closed at this time, another completed path extends from the terminal 36 over the contacts SC15B4, the point 74, the contacts SC916, the contacts SC945, the point 90, the contacts K403BC1, and the point 78, to apply a plus 12-volt potential to the base 76 of the transistor 62, which prevents said transistor from conducting at this time. At 200 degrees of rotation of the main cam line, the contacts SC945 open to interrupt the path described above to the base 76, which removes the plus 12-volt potential from the base 76 of the transistor 62. The potential at the base 76 then becomes more negative than the potential at the emitter 70 of the transistor 62, due to current flow from the point 88 over the resistor 86, the point 78, and the resistor 80 to the point 82, and said transistor therefore commences conducting.

Conduction of the transistor 62 completes an energizing path for the relay K403, said path extending from the plus 12-volt terminal 36 over the contacts SC15B4; the point 74; the contacts SC31A1; the point 72; the transistor 62; the point 66; and the relay K403; and the conductor 48, to the grounded terminal 40.

Energization of the relay K403 closes the contacts K403AC1 and K403A3, and opens the contacts K403BC1 and K403B2. Closing of the contacts K403AC1 has no effect upon the circuit of FIG. 1 at this time. Closing of the contacts K403A3 (FIG. 3) completes an illuminating circuit for the indicator light 96, as previously described, but illumination of that light at this time has no particular significance. Opening of the contacts K403BC1 has no effect upon the circuit of FIG. 1 at this time. Opening of the contacts K403B2 (FIG. 3) interrupts the energizing circuit for the relay K301 and thereby disables the energizing circuits for the solenoid L2 and the relay K307, as previously described. However, since the accounting machine is in the midst of an operating cycle at this time, such disabling action is without any effect.

As the plural-cycle portion of the new balance operation of the accounting machine is completed, the auxiliary cam line commences rotation for the data-erasing and storage portions of the new balance operation. At 18 degrees of rotation of said cam line, the contacts SC903 (FIG. 2) close, to complete the previously-described erasing circuits for all channels, if all of said circuits are functioning properly. Completion of these circuits causes the application of positive potential over the points 20 and the diodes 42, to the points 44 in the base circuits for the parallel-connected transistors 54. Since the base 52 of each transistor 54 is now positive with respect to the emitter 56, conduction is cut off in each transistor 54.

Interruption of the current flow through all of the transistors 54 causes the base 76 of the transistor 62 to assume the same potential as the emitter 70 of said transistor, which cuts off conduction in the transistor 62 and interrupts the energizing circuit for the relay K403, causing said relay to deenergize.

However, if one or more of the erasing and recording circuits of the accounting machine is not functioning properly, then current will not flow through such circuit, and a positive potential will not be applied to the base of its associated transistor 54 over the diode 42. That transistor will therefore continue to conduct, providing a current path so that a negative potential will be maintained at the base of the transistor 62. It, too, will therefore continue to conduct, and the relay K403 will accordingly remain in energized condition.

At 45 degrees of rotation of the auxiliary cam line, the contacts SC916 are closed. Since the contacts SC945, controlled by the main cam line of the accounting machine, are also closed at this time, a circuit path extending from the plus 12-volt terminal 36 over the contacts SC15B4; the point 74; the contacts SC916; and the contacts SC945, to the point 90, is completed. If there has been a failure in one or more of the erasing and recording circuits, and the relay K403 is still energized, as previously described, then the contacts K403AC1 are in a closed condition, and a holding circuit for the relay K403 is thus established, continuing from the point 90 over the contacts K403AC1; the relay K403; and the conductor 48, to the grounded terminal 40. The relay K403 will be maintained in energized condition over this circuit, and can only be deenergized by turning off the power to the machine. As has been previously described, energization of the relay K403 causes the indicator light 96 to be illuminated, to indicate a storage failure to the machine operator, and also causes the relay K301 to be deenergized, to disable the energizing circuits for the solenoid L2 and the relay K307, and thus prevents any further machine operations after conclusion of the new balance operation. This, in effect, locks the machine, which machine must be turned off and then turned back on again before any further operations can be made.

On the other hand, if all of the erasing and recording circuits are functioning properly, and the relay K403 is deenergized, as previously described, then, when the contacts SC916 close at 45 degrees of rotation of the auxiliary cam line, a circuit path is completed which extends from the plus 12-volt terminal 36 over the contacts SC15B4; the point 74; the contacts SC916; the contacts SC945; the point 90; the contacts K403BC1; and the point 78, to the base 76 of the transistor 62. This causes the application of a plus 12-volt potential to the base 76 and prevents conduction of the transistor 62, which in turn prevents energization of the relay K403. The relay K403 is thus maintained in a deenergized condition for the remainder of the new balance operation.

It may be noted that the contacts SC15B4, which open only during a balance pick-up operation of the accounting machine, are included to keep the relay K403 from energizing during a balance pick-up operation, which it would otherwise do, so that the accounting machine would always be locked against further operation at the end of a balance pick-up operation. The contacts SC15B4 thus isolate the checking circuit of FIG. 1 during a balance pick-up operation.

Once the condition of the relay K403 has been established during the erasing in-sweep of the ledger card, this condition (either energized or deenergized) will be maintained through the recording out-sweep of the ledger card, to the conclusion of the new balance operation. At that time, if there has been a failure in any one or more of the erasing and recording circuits, the machine will be locked against further operation, so that the failure can be investigated. If there has been no failure in the erasing and recording circuits, then the next balance pick-up operation can be made, at which time the contacts SC15B4 open to interrupt the previously-described circuit path to the base 76 of the transistor 62. Alternatively, certain other accounting machine operations can be made following a new balance operation, in which case the contacts SC945 open to interrupt the aforementioned circuit path.

It may be seen that a simple and effective checking device is provided by the present invention, which is effective to check failure of the auxiliary cam line to operate following the plural operation of the main cam line, and to check any type of failure in the erasing and recording circuits which interrupts the current flow through said circuits. Such failures may include malfunction of any of the contacts in said circuits, as well as breakdown of any of the diodes 28.

While the form of circuitry shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a device capable of erasing information from a record medium and recording information on said medium in a plurality of locations, the combination comprising a plurality of erasing and recording circuits for erasing information from a record medium and recording information on said record medium in a plurality of locations, each circuit including an erasing and recording element and at least one control element;

a plurality of checking means connected in parallel, each checking means including a signal-translating element having a control component connected to one of the erasing and recording circuits, each of said checking means being rendered non-conducting during an operation of said erasing and recording circuits when current passes through its erasing and recording circuit, and conducting in case of a failure in the erasing and recording circuit which interrupts the conduction thereof;

signal-translating means controlled by the parallel combination of checking means and being non-conducting when none of said checking means are conducting, said signal-translating means being adapted to conduct when one or more of said checking means is conducting;

a control relay capable of controlling further operation of said device, and controlled by said signal-translating means to be deenergized during an operation in which the erasing and recording circuits are functioning properly, and energized in the event of a failure in one or more of the erasing and recording circuits during an operation;

first holding means controlled by said control relay for maintaining said relay in energized condition in the event of a failure in one or more of the erasing and recording circuits during an operation;

second holding means controlled by said control relay for maintaining said relay in deenergized condition during an operation in which the erasing and recording circuits are functioning properly;

locking means controlled by said control relay and operable by energization of said relay to lock said device against further operation in the event of a failure in one or more of the erasing and recording circuits; and indication means controlled by said control relay and operable by energization of said relay to provide an indication in the event of failure in one or more of the erasing and recording circuits.

2. In a device capable of altering the condition of a plurality of information storage areas on a record member, the combination comprising a plurality of operating circuits for altering the condition of a plurality of information storage areas on a record member, each circuit including an operating element and at least one control element;

a plurality of checking means connected in parallel, each checking means including a signal-translating element having a control component connected to one of the operating circuits, each of said checking means being rendered non-conducting when current passes through its operating circuit and conducting in case of a failure in the operating circuit which interrupts the conduction thereof;

signal-translating means controlled by the parallel combination of checking means and being non-conducting when none of said checking means are conducting, said signal-translating means being adapted to conduct when one or more of said checking means is conducting;

a control relay capable of controlling further operation of said device, and controlled by said signal-translating means to be energized in the event of a failure in one or more of the operating circuits;

locking means controlled by said control relay and operable by energization of said relay to lock said device against further operation in the event of a failure in any one or more of the operating circuits; and indication means controlled by said control relay and operable by energization of said relay to provide an indication in the event of failure in one or more of the operating circuits.

3. In a device capable of altering the condition of a plurality of information storage areas on a record member, the combination comprising a plurality of operating circuits for altering the condition of a plurality of information storage areas on a record member, each circuit including an operating element and at least one control element;

a plurality of checking means connected in parallel, one checking means associated with each operating circuit, being rendered non-conducting when current passes through its operating circuit, and conducting in case of a failure in the operating circuit which interrupts the conduction thereof;

signal-translating means controlled by the parallel combination of checking means and being non-conducting when none of said checking means are conducting, said signal-translating means being adapted to conduct when one or more of said checking means is conducting;

control means capable of controlling further operation of said device, and controlled by said signal-translating means in accordance with the condition of the plurality of checking means; and locking means controlled by said control means to lock said device against further operation in the event of a failure in any one or more of the operating circuits.

4. In a device capable of altering the condition of a plurality of information storage areas on a record member, the combination comprising a plurality of operating circuits for altering the condition of a plurality of information storage areas on a record member, each circuit including an operating element and at least one control element;

a plurality of checking means connected in parallel, one checking means associated with each operating circuit, being rendered non-conducting during an operation of said operating circuits when current passes through its operating circuit and conducting in case of a failure in the operating circuit which interrupts the conduction thereof;

signal-translating means controlled by the parallel combination of checking means and being non-conducting when none of said checking means are conducting, said signal-translating means being adapted to conduct when one or more of said checking means is conducting;

control means capable of controlling further operation of said device, and controlled by said signal-translating means to be in a first condition when the operating circuits are performing properly, and to be in a second condition in the event of a failure in one or more of the operating circuits; and holding means capable of maintaining said control means in whichever condition it assumes during an operation of the operating circuits.

5. In a device capable of altering the condition of a plurality of information storage areas on a record member, the combination comprising a plurality of operating circuits for altering the condition of a plurality of information storage areas on a record member, each circuit including an operating element and at least one control element;

a plurality of checking means connected in parallel, one checking means associated with each operating circuit, being rendered non-conducting when current passes through its operating circuit, and conducting in case of a failure in the operating circuit which interrupts the conduction thereof;

signal-translating means controlled by the parallel combination of checking means and being non-conducting when none of said checking means are conducting, said signal-translating means being adapted to conduct when one or more of said checking means is conducting; and control means capable of controlling further operation of said device, and controlled by said signal-translating means in accordance with the condition of the plurality of checking means.

6. In a device capable of altering the condition of a plurality of information storage areas on a record member, the combination comprising a plurality of operating circuits for altering the condition of a plurality of information storage areas on a record member, each circuit including an operating element and at least one control element;

a plurality of checking means connected in parallel, one checking means associated with each operating circuit, being in a first operating condition during an operation of said operating circuits when current passes through its operating circuit, and being in a second operating condition in case of a failure in the operating circuit which interrupts the conduction thereof;

signal-translating means controlled by the parallel combination of checking means and being in a first state when none of said checking means are in said second operating condition, said signal-translating means being adapted to be in a second state when one or more of said checking means is in said second operating condition;

control means capable of controlling further operation of said device, and controlled by the state of said signal-translating means to be in a first condition when the operating circuits are functioning properly and to be in a second condition in the event of a failure in one or more of the operating circuits;

holding means capable of maintaining said control means in whichever condition it assumes during an operation of the operating circuits; and locking means controlled by said control means and operable to lock said device against further operation in the event of a failure in one or more of the operating circuits.

7. In a device capable of altering the condition of a plurality of information storage areas on a record member, the combination comprising a plurality of operating circuits for altering the condition of a plurality of information storage areas on a record member, each circuit including an operating element and at least one control element;

a plurality of checking means connected in parallel, one checking means associated with each operating circuit, being in a first operating condition when current passes through its operating circuit, and being in a second operating condition in case of a failure in the operating circuit which interrupts the conduction thereof;

signal-translating means controlled by the parallel combination of checking means and being in a first state when none of said checking means are in said second operating condition, said signal-translating means being adapted to be in a second state when one or more of said checking means is in said second operating condition; and control means capable of controlling further operation of said device, and controlled by the state of said signal-translating means in accordance with the condition of the plurality of checking means.

8. In a device capable of altering the condition of at least one information storage area on a record member, the combination comprising at least one operating circuit for altering the condition of an information storage area on a record member, said circuit including an operating element and at least one control element;

checking means associated with each operating circuit, being rendered non-conducting when current passes through the operating circuit, and conducting when the passage of current through the operating circuit is interrupted by a failure in said circuit;

signal-translating means controlled by the checking means and adapted to be rendered conducting by conduction of said checking means;

control means capable of controlling further operation of said device, and controlled by said signal-translating means in accordance with the condition of the checking means; and locking means controlled by said control means to lock said device against further operation in the event of a failure in the operating circuit.

9. In a device capable of altering the condition of at least one information storage area on a record member, the combination comprising at least one operating circuit for altering the condition of an information storage area on a record member, said circuit including an operating element and at least one control element;

checking means associated with each operating circuit, being rendered non-conducting during an operation of said operating circuit when current passes through the operating circuit, and conducting when the passage of current through the operating circuit is interrupted by a failure in said circuit;

signal-translating means controlled by the checking means and adapted to be rendered conducting by conduction of said checking means;

control means capable of controlling further operation of said device, and controlled by said signal-translating means to be in a first condition when said operating circuit is functioning properly and to be in a second condition in the event of a failure in the operating circuit; and holding means capable of maintaining said control means in whichever condition it assumes during an operation of the operating circuit.

10. In a device capable of altering the condition of at least one information storage area on a record member, the combination comprising at least one operating circuit for altering the condition of an information storage area on a record member, said circuit including an operating element and at least one control element;

checking means associated with each operating circuit, being rendered non-conducting when current passes through the operating circuit, and conducting when the passage of current through the operating circuit is interrupted by a failure in said circuit;

signal-translating means controlled by the checking means in accordance with the condition thereof; and control means capable of controlling further operation of said device, and controlled by said signal-translating means in accordance with the condition of the checking means.

References Cited by the Examiner

Boennighausen, R. A.: "Circuit for Detecting Errors," IBM Technical Disclosure Bulletin, vol. 3, No. 7, p. 30, December 1960.

BERNARD KONICK, *Primary Examiner.*

A. I. NEUSTADT, *Assistant Examiner.*